United States Patent
Kurokawa et al.

(10) Patent No.: US 7,251,049 B2
(45) Date of Patent: Jul. 31, 2007

(54) IMAGE PROCESSING DEVICE, IMAGE PROCESSING METHOD AND IMAGE PROCESSING SYSTEM

(75) Inventors: Kazunori Kurokawa, Ebina (JP); Kouichi Kawahara, Ebina (JP); Yoshihiro Ohshima, Ebina (JP); Yasuaki Mitobe, Ebina (JP); Junko Ohuchi, Ebina (JP); Takanori Okuoka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 826 days.

(21) Appl. No.: 10/288,333

(22) Filed: Nov. 6, 2002

(65) Prior Publication Data

US 2003/0184805 A1 Oct. 2, 2003

(30) Foreign Application Priority Data

Mar. 29, 2002 (JP) ............................. 2002-097108

(51) Int. Cl.
*G06F 3/12* (2006.01)
*G06F 15/00* (2006.01)

(52) U.S. Cl. ..................................... 358/1.15; 358/1.18

(58) Field of Classification Search ........... 358/426.03, 358/115, 1.15, 1.14, 1.13, 1.18, 1.1, 1.16, 358/1.17, 407, 426.02, 426.06, 426.07, 426.11, 358/468, 539, 540; 345/629, 630; 382/232, 382/115, 278, 305; 380/201, 203, 243
See application file for complete search history.

(56) References Cited

U.S. PATENT DOCUMENTS 6,625,316 B1 * 9/2003 Maeda ....................... 382/203

FOREIGN PATENT DOCUMENTS

| JP | 04039451 | * | 2/1992 |
| JP | 9244828 | * | 9/1997 |
| JP | A 9-244828 | | 9/1997 |
| JP | A-11-149511 | | 6/1999 |
| JP | A-11-331557 | | 11/1999 |
| JP | 2001125760 | * | 5/2001 |
| JP | A 2001-125760 | | 5/2001 |

* cited by examiner

*Primary Examiner*—Dov Popovici
(74) *Attorney, Agent, or Firm*—Oliff & Berridge, PLC

(57) ABSTRACT

When image synthesis using form data, for which a pass code has been set, or merge data, for which a password has been set, is completed, the synthesized data is encoded and held. Thereafter, a client terminal is notified by e-mail that image synthesis has been completed. Thereafter, when a request for output is inputted, collation of passwords is carried out. If the passwords match, decoding and printing-out of encoded synthesized data, or transmission of the encoded synthesized data is carried out.

20 Claims, 9 Drawing Sheets

IMAGE PROCESSING DEVICE, IMAGE PROCESSING METHOD AND IMAGE PROCESSING SYSTEM

BACKGROUND OF THE INVENTION

1. Field of the Invention

The present invention relates to an image processing device, an image processing method and an image processing system which carry out image processing on the basis of image data or a drawing command. In particular, the present invention relates to an image processing device, an image processing method and an image processing system which synthesize and output an image, which is based on image data or a drawing command inputted from an image processing terminal, and an image which is stored in advance.

2. Description of the Related Art

DTP (desktop publishing) has come to be widely used as a way of digitizing in the field of printing processing. In DTP, at a processing device such as a personal computer or a work station or the like, a page layout is prepared by carrying out preparation, manipulation, editing, and the like of an image. On the basis of this page layout, preparation of a film for exposing a printing plate is carried out (CEPS), or a press plate for printing is prepared by directly writing onto a printing plate (CTP: computer-to-plate).

Accompanying the spread of DTP and the improvement in image quality of digital printers such as laser printers, page printers, and the like (which hereinafter are called "printers") printing-out by using a printer is carried out in order to carry out simulations of printing machines.

Namely, when an image or a document prepared by applications on a computer is to be printed out, the image or document is outputted to an image processing device, is subjected to predetermined image processings at the image processing device, and is printed-out from a printer.

Among applications used at a computer, there are applications which are provided with a so-called merge printing function which, when an image or document or the like prepared at a computer is to be printed-out, print-out by superposing the image or document or the like on a form which is set in advance.

If an outer frame or a predetermined mark or the like is saved as a form by using the merge printing function, this form and the separately-prepared image or document or the like can be synthesized, and the synthesized image can be printed out.

Japanese Patent Application Laid-Open (JP-A) No. 9-244828 proposes a security system used in printing processing or the like. In this security system for a printer, when a password or the like is designated and printing-out is requested, a job number is set and the printing data is stored in an HD or the like. Thereafter, by inputting the job number and the password, printing processing based on that printing data is executed. In this way, it is possible to prevent the contents which are printed-out from being viewed by a third party.

Further, JP-A No. 2001-125760 discloses a printing system which can make form data secure. In this printing system, for example, signature data or certifying seal data is stored as form data together with a password. When the signature data or certifying seal data is to be used as form data, by inputting it along with the password of the form data which is to be used, it is possible to use that form data. In this way, the signature data or the certifying seal data can be made secure, and cannot be used indiscriminately.

However, in these conventional proposals, even if a merge form which is synthesized with merge data is made secure, the synthesized data which is synthesized by the merging processing, and the print-out based on the synthesized data are not secure. Namely, although the security of the form data is considered, the security of the data which is synthesized by the merging processing is not considered. There are cases in which printing-out cannot be carried out at the timing desired by the client, there is a high possibility that the synthesized data and the printed output can be viewed by a third party, and the spool of the synthesized data and the reprinting and the like also cannot be made secure.

SUMMARY OF THE INVENTION

The present invention has been conceived of in light of the above-described circumstances, and an object of the present invention is to provide an image processing device, an image processing method and an image processing system which can provide desired security not only for form data used in merge printing, but also for synthesized data in which the form data is synthesized, and printed output based on the synthesized data, and the like.

In order to achieve the above object, a first aspect of the present invention is an image processing device which, on the basis of a job inputted from an image processing terminal, carries out merging processing which synthesizes, with a predetermined merge form, a merge image which is based on one of image data and a drawing command of the job, the image processing device comprising: a storing component which stores form data of the merge form and a verification code set for the merge form; a read-out component which, when a verification code of a merge form is inputted in the job, collates the inputted verification code and the verification code stored in the storing component, and reading out, from the storing component, form data whose verification code matches the inputted verification code; a synthesizing component which synthesizes merge data, which is based on the merge image, with the form data read out by the read-out component, so as to generate synthesized data; an encoding component which encodes the synthesized data generated by the synthesizing component; and a holding component which holds the encoded synthesized data.

In accordance with the first aspect of the present invention, the form data stored in the storing component is read out, and merging processing is carried out. At this time, when form data for which a verification code has been set is used, the verification code is designated by the job.

The read-out component collates the verification codes, and when the verification codes match, reads out the corresponding form data from the storing component and outputs it to the synthesizing component. Due to the synthesizing component synthesizing the merge data with the form data, image data, in which the merge image is superposed on the merge form, is generated as synthesized data.

This synthesized data is held in the holding component in a state of being encoded by the encoding component. In this way, an image, which uses a merge form for which a verification code has been set, can be prevented from being easily viewed.

Moreover, according to a second aspect of the present invention, the image processing device further comprises an outputting component which, due to a request for output being inputted, outputs data corresponding to the encoded synthesized data held in the holding component.

According to a third aspect of the present invention, when a verification code for the merge image is set in the job, the synthesized data generated by the synthesizing component regardless of the form data is encoded by the encoding component and is held in the holding component.

In accordance with the third aspect of the present invention, not only at times when a merge form, for which a verification code has been set, is used, but also at times when a verification code has been set for the merge image, the synthesized data is held in an encoded form, and it is possible to prevent the synthesized data and an image corresponding to the synthesized data from being viewed easily.

Moreover, according to a fourth aspect of the present invention, the image processing device further comprises an output collating component which, when the request for output is inputted, collates a verification code inputted together with the request for output, and at least one of a verification code set for the merge image and a verification code of the merge form, and the outputting component carries out outputting processing on the basis of results of collation by the output collating component.

In accordance with the fourth aspect of the present invention, when there is a request to output the synthesized data which is encoded and held or an image corresponding to the synthesized data, inputting of the verification code is requested. When the verification codes match, output processing is carried out.

In this way, synthesized data or a synthesized image, which is based on a merge image or a merge form for which a verification code has been set, can reliably prevented from being viewed indiscriminately.

In the present invention, the encoded synthesized data may be decoded by the decoding component, and outputted to a print-out device by the outputting component. Further, the outputting component may output the encoded synthesized data to the image processing terminal.

At this time, when data corresponding to the synthesized data is outputted to the image processing terminal, the data is preferably outputted in an encoded state. In this case, by providing a decoding component at the image processing terminal, the image corresponding to the synthesized data can be confirmed at the image processing terminal.

Further, in the present invention, it is preferable to provide a notifying component which notifies the image processing terminal that the holding component is holding the encoded synthesized data.

At this time, the notifying component may output a preview image of the synthesized image which corresponds to the synthesized data, on the basis of a request from the image processing terminal. In this way, the image which has been subjected to merging processing can be easily and accurately confirmed before printing output and the like are carried out.

Further, in the present invention, a mechanical storage medium such as an HD or the like, or a storage medium such as a semiconductor memory or the like, can be used as the holding component. Further, it may be possible to select, on the basis of the output settings in the merge job, whether an HD is to be used or a semiconductor memory is to be used as the holding component.

Namely, when there is the possibility that immediate printing-out may be requested in the merge job, it is preferable to hold the encoded synthesized data in a semiconductor memory. When it is possible to judge that there is time until there will be an actual request for output, it is preferable to hold the encoded synthesized data in a storage medium such as an HD or the like.

Further, it is possible to structure the present invention such that a list of merge forms registered in the storing component is transmitted to the image processing terminal at a predetermined timing, and when merging processing is requested from the image processing terminal, the merge form can be selected from the list of merge forms. In this way, it is possible to easily and correctly request merging processing.

Moreover, the read-out component of the present invention may judge the frequency of processing for each of the registered merge forms, and, on the basis of the results of this judgement, merge forms maybe transmitted, for example, from a storage medium such as an HD to a storage medium such as a semiconductor memory. In this way, when using merge forms which are used frequently, the merging processing can be carried out rapidly.

DESCRIPTION OF THE PREFERRED EMBODIMENT

Figure 1:
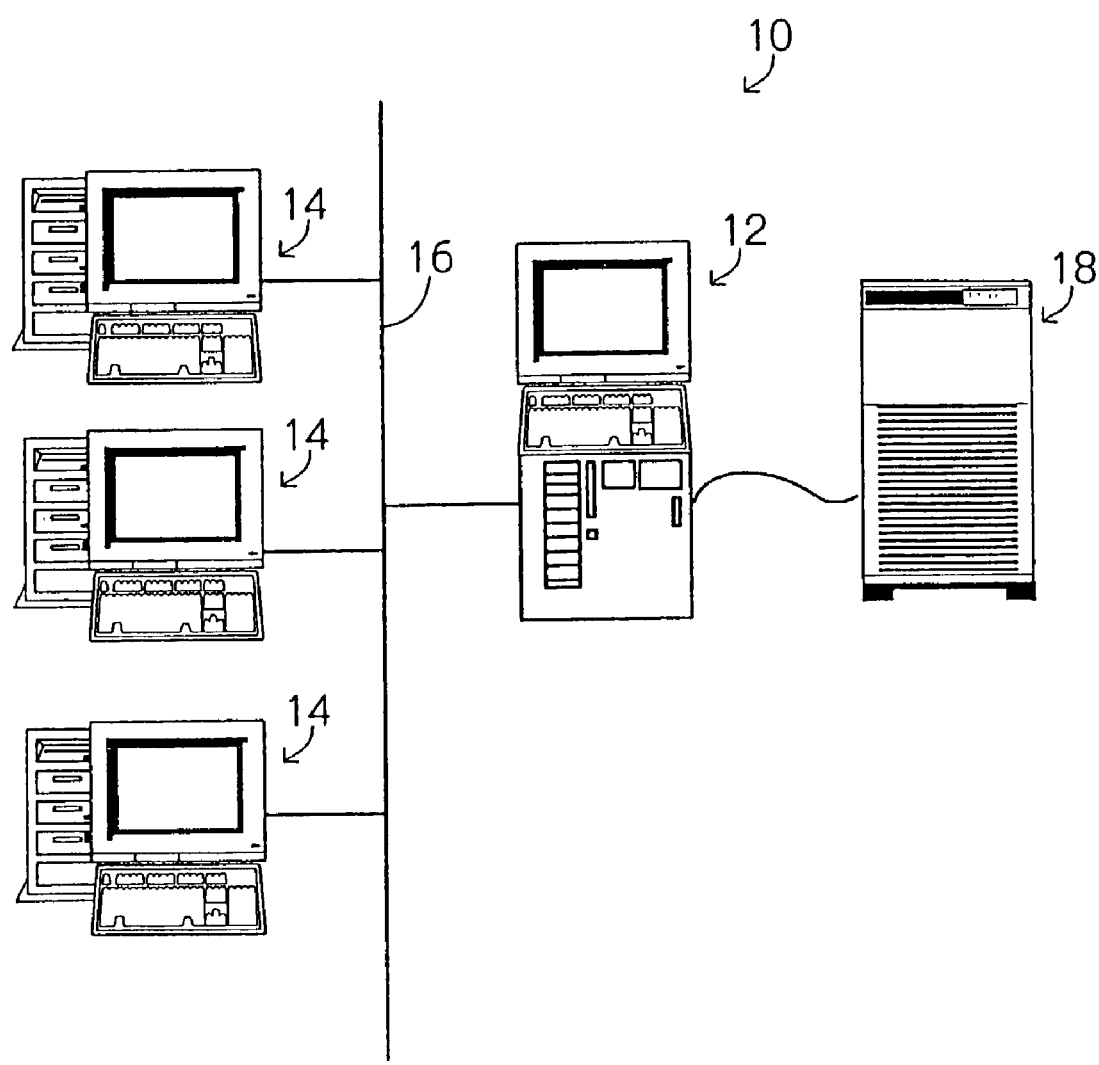
FIG. 1 is a schematic structural diagram of a network applied to the embodiment of the present invention.

Hereinafter, an embodiment of the present invention will be described with reference to the drawings. FIG. 1 shows the schematic structure of a network 10 applied to the present embodiment. In the network 10, a print server 12, which is provided as an image processing device to which the present invention is applied, and a plurality of client terminals 14, which are provided as image processing terminals and input devices, are connected as a network via a communication line 16.

A printer 18 serving as a print-out device is connected to the print server 12. When the print server 12 receives a print job outputted from the client terminal 14, the print server 12 can carry out printing output corresponding to the print job. Hereinafter, explanation will be given of a case in which the image processing device is used as the print server. However, the image processing device of the present invention is not limited thereto, and may carry out predetermined image processings while being provided as any of various types of intermediate servers, such as a file server or the like, connected on a network to the client terminals 14.

Figure 2:
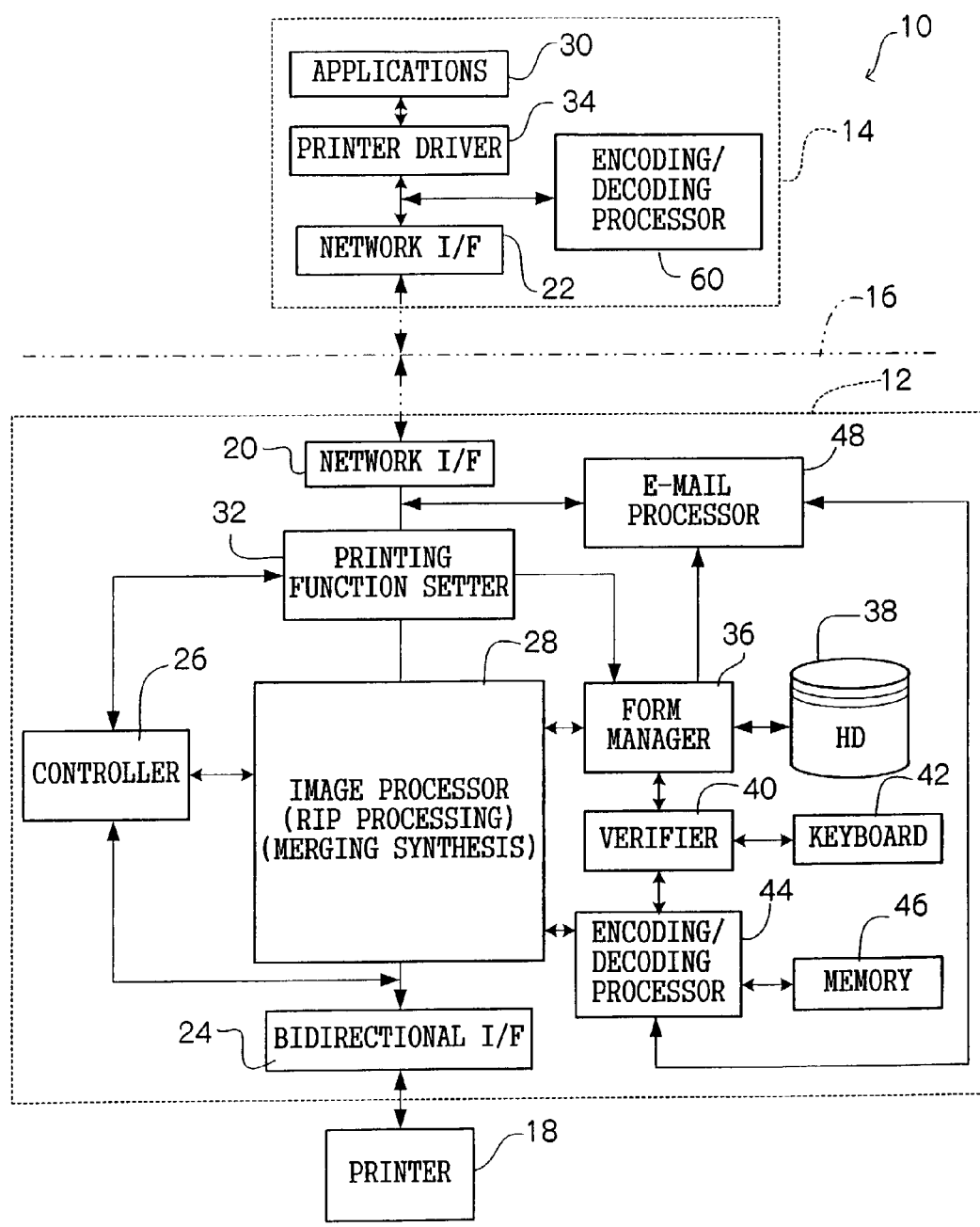
FIG. 2 is a function block diagram showing the schematic structure of a print server and a client terminal to which the present invention is applied.

As shown in FIG. 2, a network interface (network I/F) 20 and a network interface (network I/F) 22, which each form an outputting component (outputting device), are provided at the print server 12 and the client terminal 14. The print server 12 and the client terminal 14 are connected to the communication line 16 via these network I/Fs 20, 22. Further, the print server 12 is provided with a bidirectional interface (bidirectional I/F) 24, such as an Ethernet (R) or the like, which forms the outputting component (outputting device), and is connected to the printer 18 via the bidirectional I/F 24.

There may be a plurality of the printers 18 connected to the print server 12, and a plurality of bidirectional I/Fs 24 or a plurality of types of bidirectional I/Fs 24 may be used. Further, a LAN (local area network) connection, such as Apple Talk, Ethernet (R), or the like, may be used as the network connection between the plural client terminals 14 and the print server 12, or a WAN (wide area network) connection may be used. Namely, connection in accordance with an arbitrary network protocol can be used.

The print server 12 can be structured by, for example, adding a PCI board equipped with predetermined functions to a personal computer (PC). Or, the print server 12 may be provided with an input device such as a keyboard, a mouse or the like, and a display device such as a CRT display, an LCD display or the like, and with a WYSIWYG function which processes an image displayed on the display device and prints-out the displayed image.

A print controller 26, which controls the printer 18 and the printing processings using the printer 18, and an image processor 28, which serves as a synthesizing component forming a data processing device, are provided at the print server 12. The image processor 28 carries out RIP processing which generates raster data on the basis of image data and drawing data, drawing commands or the like inputted as a print job from the client terminal 14.

At the print server 12, the inputted print job is stored in a processing queue. The print job stored in the processing queue is read out in order, and image processing (RIP processing) is carried out. The data, which has been subjected to image processing and is to be outputted to the printer 18 (the raster data), is stored in a printing queue, and is outputted in order to the printer 18 from the printing queue. Further, the print server 12 has the usual structure in which jobs for which printing processing has not been designated and jobs for which execution of printing processing is to be designated separately are stored and held in a holding queue. Note that the print server 12 can utilize any of various, conventionally-known structures, and detailed description thereof will be omitted in the present embodiment.

The client terminal 14 is equipped with various types of applications 30. By using the applications 30, the client terminal 14 can carry out document preparation, and image processings such as preparation, manipulation, editing and the like of images, and the like. Further, due to the client terminal 14 transmitting prepared image data or drawing data and various types of processing instructions to the print server 12 as a print job, the print server 12 carries out the designated image processings on the print job, and outputs it to be printer 18. A printed matter corresponding to the print job is thereby obtained.

A printing function setter 32 is provided at the print server 12. Due to various types of printing functions being set, printing processing based on the set printing functions is possible.

A printer driver 34, which enables setting of various types of printing functions, is provided at the client terminal 14. At the client terminal 14, setting of the various types of printing functions using the printer driver 34 is possible.

The setting of various types of conventionally-known printing functions is possible at the print server 12. These printing functions can be set by using, for example, various user interfaces provided at the client terminal 14. At the printing function setter 32, the printing functions set in the print job are determined, and the respective printing functions are set so as to be implemented at the image processor 28 and the printer controller 26.

Merging processing, which is for superposing an image (hereinafter called an "merge image"), which corresponds to image data or a drawing command inputted from the client terminal 14, on a predetermined merge form, is possible at the print server 12. Hereinafter, the merge function provided at the print server 12 will be described.

The print server 12 is provided with a form manager 36, which forms a read-out component or the data processing device and which manages merge forms, and an HD 38, which serves as a storing component(storing device) or a holding component (holding device) and which stores the form data of the merge forms.

When merging processing for a merge image is set, the form manager 36 reads the corresponding form data out from the HD 38, and outputs it to the image processor 28. In this way, at the image processor 28, image processing (merging synthesis), which synthesizes the image data of the merge image (hereinafter, "merge data") and the form data, is carried out so as to generate synthesized data.

A security function for the merging processing is provided at the print server 12. By setting a verification code (hereinafter, "pass code") for the merge form, the form data of that merge form is stored in the HD 38 together with the pass code.

Further, the print server 12 is provided with a verifier 40 which forms the read-out component or the data processing device and which serves as an output collating component (output collating device). When merging processing is to be carried out, due to a merge form being designated and the pass code of that merge form being inputted, the inputted pass code and the pass code of the merge form are collated at the verifier 40. As a result, due to the pass codes matching, the form manager 36 reads out the form data of the corresponding merge form from the HD 38, and outputs it to the image processor 28.

Namely, at the print server 12, when form data (a merge form) for which a pass code is set is to be used, input of the pass code of that form data is requested. Due to the pass codes matching, use of that form data is enabled.

On the other hand, at the print server 12, it is possible to designate a verification code (hereinafter, "password") for the merging processing. When a password is set, by inputting this password from a keyboard 42 provided as an inputting component, processings such as printing-out and the like are possible.

At this time, the verifier 40 also carries out collating of the password inputted from the keyboard 42 and the password set in the merge job.

Further, the print server 12 is provided with an encoding/decoding processor 44, which serves as an encoding component and a decoding component (decoding device) forming the data processing device, and a memory 46 (a semiconductor memory) serving as a holding component (holding device). At the print server 12, when merging processing for which a password is set or merging processing using form data for which a pass code is set is selected, synthesized data, in which the merge data and the form data are synthesized, is encoded at the encoding/decoding processor 44, and is stored in the memory 46 or the HD 38.

Further, at the print server 12, when printing processing or the like of the encoded synthesized data is to be carried out on the basis of the settings for the merging processing, by verifying the pass code or the password, the encoded synthesized data is decoded, and predetermined processings are carried out.

The print server 12 is provided with an e-mail processor 48 serving as a notifying component. At the e-mail processor 48, user names for each client or client terminal 14 and e-mail addresses corresponding thereto are managed by being stored in the HD 38 or the like. The e-mail processor 48 transmits e-mail to each user, or to each group set in advance, or the like, at an arbitrary timing set in advance.

For example, at the print server 12, when generation and encoding of synthesized data are completed, the name of the user or the like is obtained from the job transmitted from the client terminal 14. E-mail giving notice that a predetermined processing has been completed is forwarded to that user. At this time, preview display of the image corresponding to the synthesized data is possible at the client terminal 14. If a preview image is requested from the client terminal 14, the print server 12 generates preview image data and transmits it to the client terminal 14.

A user interface for setting the merging processing is provided at the client terminal 14. Settings of the merging processing can be made by using this user interface.

Figure 3:
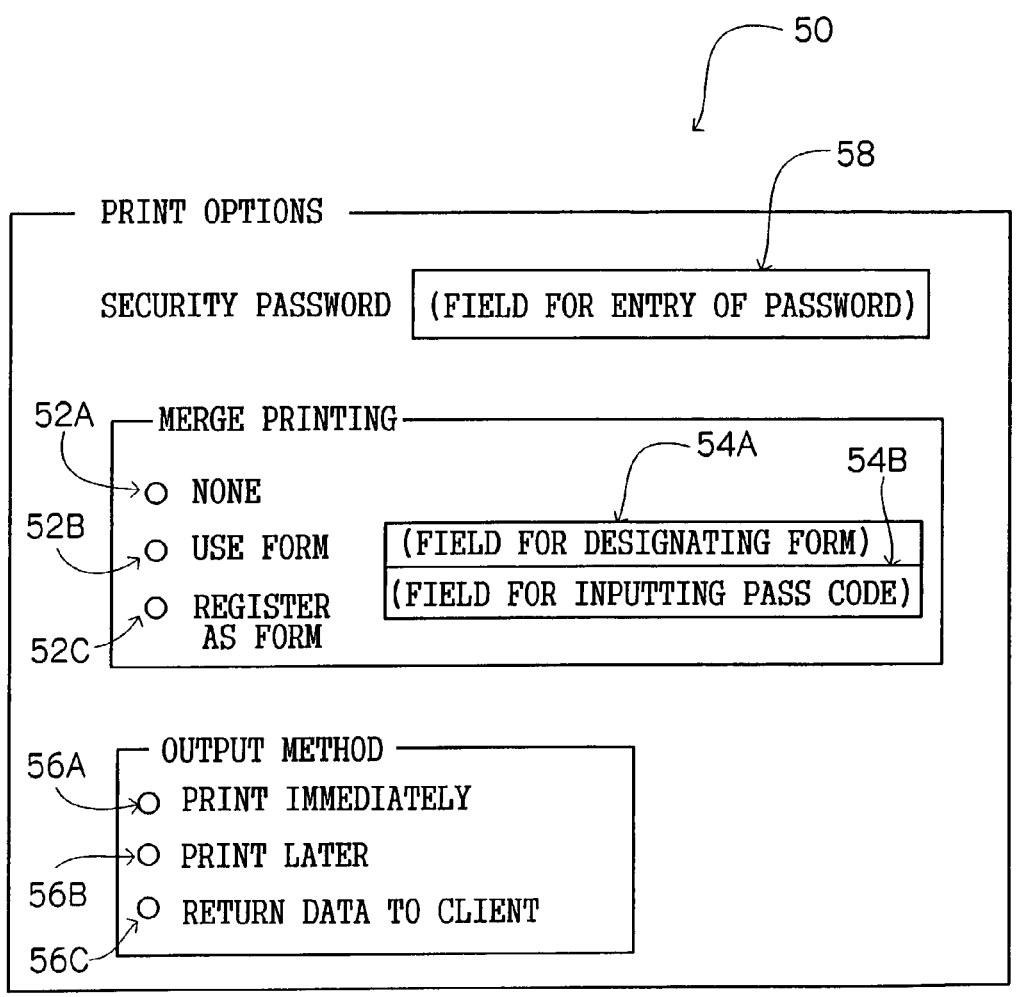
FIG. 3 is a schematic diagram showing an example of a dialog box displayed as a user interface on the client terminal.

FIG. 3 shows the basics of a setting dialog box 50 which is one example of a user interface used in setting the merging processing. In this setting dialog box 50, print options provided at the printer driver 34 are displayed by being selected. At the print server 12, by using this setting dialog box 50, it is possible to set merging processing such as merge printing and the like, and to register the merge form used in the merging processing.

The respective items of "none", "use form", and "register as form" are provided for setting the merge printing at the setting dialog box 50. By placing a mark (a check) in any of the check boxes 52A, 52B, 52C for these respective items, the corresponding processing can be selected and set.

At this time, by marking the check box 52B so as to select "use form", it is possible to input, in a form setting box 54A, the merge form or the form number to be used. When a pass code is set for the merge form (or the form number) to be used, the pass code can be inputted in a pass code input box 54B.

Further, by marking the checkbox 52C so as to select "register as form", the image data transmitted from the client terminal 14 to the print server 12 can be registered as a merge form. At this time, the name of the merge form or the form number to be registered can be inputted in the form setting box 54A. Further, when setting of a pass code for the merge form to be registered is desired, a pass code is inputted into the pass code input box 54B. A pass code can thereby be set for the merge form.

In this way, when an image such as, for example, a certifying seal image or any of various types of logos, marks or the like for which it is desired to limit the indiscriminate use thereof, is to be registered as a merge form, limits on the usage thereof can be added.

At the setting dialog box 50, the method of output can be selected. The respective items of "print immediately", "print later", and "return data (to client (client terminal))" are set as the output methods at this time. By placing a mark in any of check boxes 56A, 56B, 56C, it is possible to select and set the corresponding item.

Further, a password for the merging processing can be set at the setting dialog box 50. When a password is to be set, an arbitrary password is inputted into an input box 58.

Here, when merge printing is to be carried out, by placing a mark in the check box 56A so as to select "print immediately", at the print server 12, merging processing (image synthesis) is carried out, and right thereafter, the corresponding image data (synthesized data) is outputted to the printer 18 and printing processing is carried out.

At this time, when a password is designated or a merge form for which a pass code is set is used, at the print server 12, the synthesized data generated by carrying out image synthesis is subjected to encoding processing and is stored in the memory 46. When this is completed, notification is given that printing-out is possible.

In this way, due to the operator of the client terminal 14 inputting a request for printing-out from the keyboard 42 of the print server 12, or the like, the print server 12 carries out printing processing on the basis of the corresponding synthesized data.

In contrast, by marking the check box 56B so as to select "print later", at the print server 12, when merging processing (image synthesis) is carried out, the corresponding image data (synthesized data) is stored in the HD 38 until printing-out is instructed.

At this time, when a password is designated or a merge form for which a pass code is set is used, at the print server 12, the synthesized data generated by carrying out image synthesis is subjected to encoding processing, and thereafter, is stored in the HD 38. Notification is given of the fact that this data is stored in the HD 38 and is standing-by until there is a request for printing-out.

In this way, by inputting a request for printing-out from the keyboard 42 of the print server 12, or the like, the print server 12 reads out the corresponding synthesized data from the HD 38 and carries out printing processing.

Further, by marking the check box 56C so as to select "return data", at the print server 12, merging processing (image synthesizing) is carried out, and the synthesized image data is transmitted to the client terminal 14 in accordance with a request from the client terminal 14.

At this time, when a password is designated or a merge form for which a pass code is set is used, at the print server 12, the synthesized data generated by carrying out image synthesis is subjected to encoding processing, and notification is given to the client terminal 14 that data transmission is possible.

In this way, by a transmission instruction being inputted from the client terminal 14 to the print server 12, or by transmission instruction of the synthesized data being inputted by using an unillustrated user interface on the print server 12, the print server 12 transmits the corresponding synthesized data to the client terminal 14 as, for example, an attachment file to an e-mail message.

An encoding/decoding processor 60 is provided at the client terminal 14. When the encoded synthesized data is sent from the print server 12, the data can be decoded at the encoding/decoding processor 60.

At the printer driver 34 provided at the client terminal 14, communication with the form manager 36 of the print server 12 is carried out at a timing set in advance, and the registered merge forms of the print server 12 are updated. In this way, the registered merge forms are displayed in a list by a pull-down menu or the like in the form setting box 54A of the setting dialog box 50, and a merge form can be selected from this list.

Next, merging processing on the network 10 at which the print server 12 is provided will be described with reference to the drawings. Note that, the basic structure of the print server 12 is a conventionally-known structure. Here, mainly the processings with respect to the merge function will be described, and description of the other processings will be omitted.

Further, hereinafter, as described above, the image which is the background at the time of merging processing is a merge form, the image data is form data, the image which is synthesized with the merge form is a merge image, and the image data is merge data. Further, a job registering a merge form is a form job, and a job requesting merging processing is a merge job.

Figure 4:
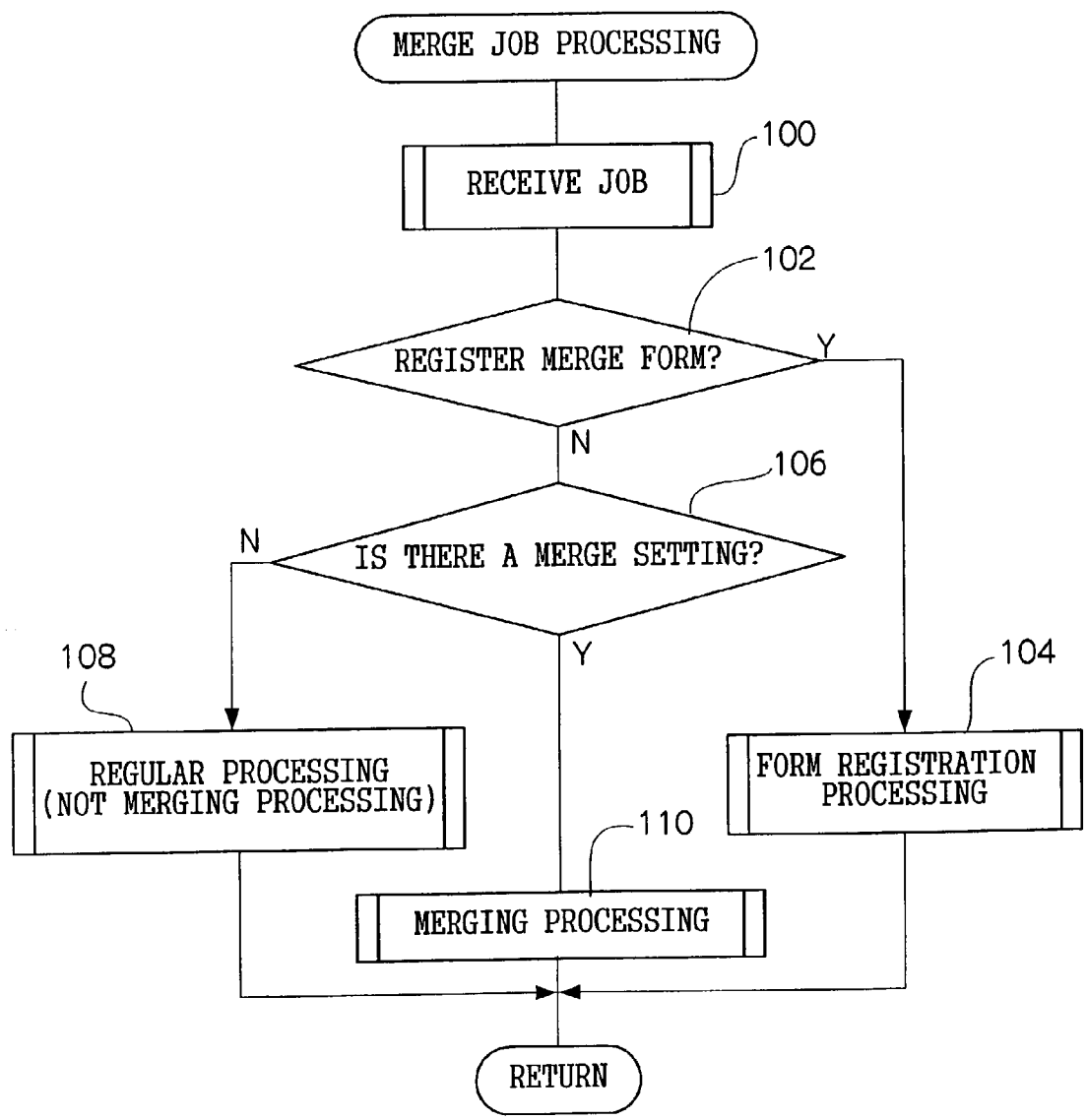
FIG. 4 is a flowchart showing a summary of processings at the print server on a job which has been inputted from the client terminal.

As shown in FIG. 4, at the print server 12, when a job is transmitted from any of the client terminals 14 on the network 10, in step 100, the job is received. At this time, for example, at the print server 12, the received job is held in a holding queue, and is processed in the order of receipt.

At the print server 12, when a job is received, the routine moves on to step 102 where a determination is made as to whether the job is a form job which requests registration of a merge form.

Here, if the job is a job requesting registration of a merge form, the determination in step 102 is affirmative. The routine moves on to step 104 where registration processing of the merge form is carried out.

The registration of the merge form is carried out by, for example, assigning form numbers in order to the merge forms for which registration is requested, and storing the merge forms in order. At this time, when a pass code is set together with the merge form, the pass code also is registered.

The registration of the merge form can use any arbitrary, conventionally-known method. Further, at the print server 12, when a merge form is to be registered, the form data may be subjected to RIP processing and stored in the HD 38 as raster data (data subjected to RIP processing), or the data format for storage can be selected from PDF format, PostScript format, or the like. Further, an arbitrary, conventionally-known structure can be used as the method of managing the merge forms (form data) at the form manager 36.

On the other hand, when the determination in step 102 is negative, the routine moves on to step 106. In step 106, a determination is made as to whether the received job is a merge job for which merging processing has been designated. If the job is not a merge job, the determination in step 106 is negative, and the routine moves on to step 108 where processings for regular jobs other than merge jobs are carried out.

In contrast, when the received job is a merge job, the determination in step 106 is affirmative. The routine moves on to step 110 where merging processing is carried out.

Figure 5:
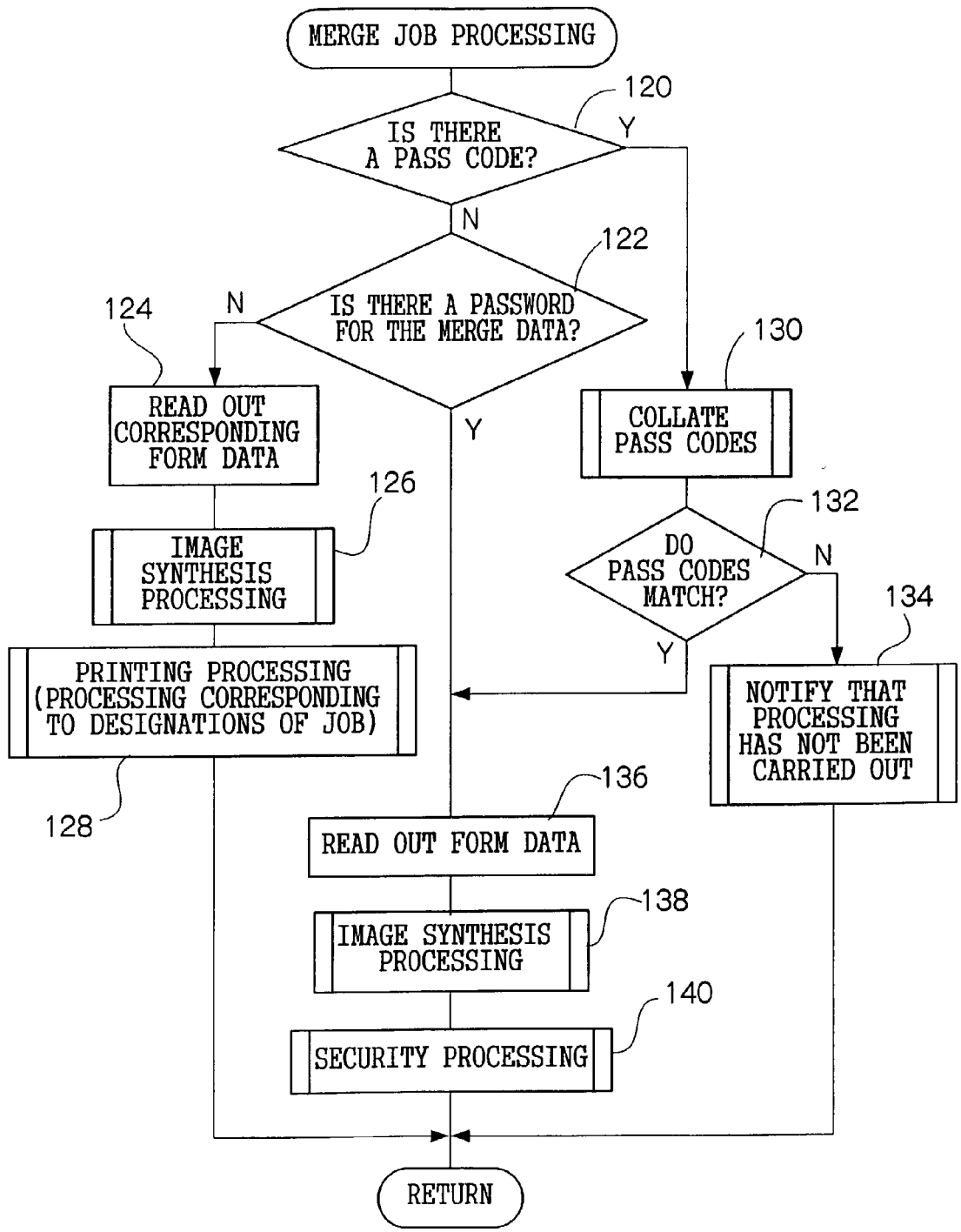
FIG. 5 is a flowchart showing a summary of processings on a merge job at the print server.

FIG. 5 shows the basics of processing for merge jobs (merging processing). In this flowchart, in initial step 120, it is confirmed whether a pass code has been set for the set form data (merge form). In step 122, it is confirmed whether a password has been set for the merge data.

Here, when there is no setting of a pass code for the form data and there is no setting of a password for the merge data, the determinations in steps 120 and 122 are negative, and the routine moves on to step 124.

In step 124, the set form data is read out from the HD 38, and in step 126, synthesizing processing of the merge data and the form data is carried out. Thereafter, the routine moves on to step 128 where regular merging processings based on the settings in the merge job, such as printing processing and the like, are carried out. Namely, regular merging processings, for which there are no security settings, are carried out.

Note that the synthesis of the form data and the merge data is carried out for each page. Further, if the form data of the set merge form (the form data read out from the HD 38) is data which has not been subjected to RIP processing, it may be subjected to RIP processing and image synthesis can be carried out by synthesizing it with merge data which has been subjected to RIP processing.

By outputting to the printer 18 the raster data which has been synthesized in this way, a printed matter, in which the designated merge form is superposed on the image of the merge print job, is obtained.

In contrast, when a pass code has been set for the form data or a pass code has been inputted, the determination in step 120 is affirmative, and the routine moves on to step 130.

In step 130, collation of the pass code of the form data and the pass code inputted in the merge job is carried out. In step 132, it is confirmed whether or not the pass codes match or whether or not there is form data of a matching pass code. Here, if the pass codes do not match, the determination in step 132 is negative. The routine moves on to step 134 where an e-mail message warning that the pass codes do not match is transmitted to the client terminal 14 or the user which requested the merge job, and the merging processing is completed.

In this way, it is possible to reliably prevent form data, for which a pass code is set, from being mistakenly used.

Further, when the pass codes match, the determination in step 132 is affirmative, and the routine moves on to step 136. In step 136, the corresponding form data is read out from the HD 38. In step 138, image synthesizing processing of the merge data and the form data is carried out so as to generate synthesized data.

On the other hand, when no pass code for the form data has been inputted but a password is set for the merge data, the determination in step 120 is negative, and the determination in step 122 is affirmative. In this way, the routine moves on to step 136 where the set form data is read out from the HD 38, and image synthesis is carried out (step 138).

When image synthesis has been completed in this way, the routine moves on to step 140 where security processing is carried out.

Figure 6A:
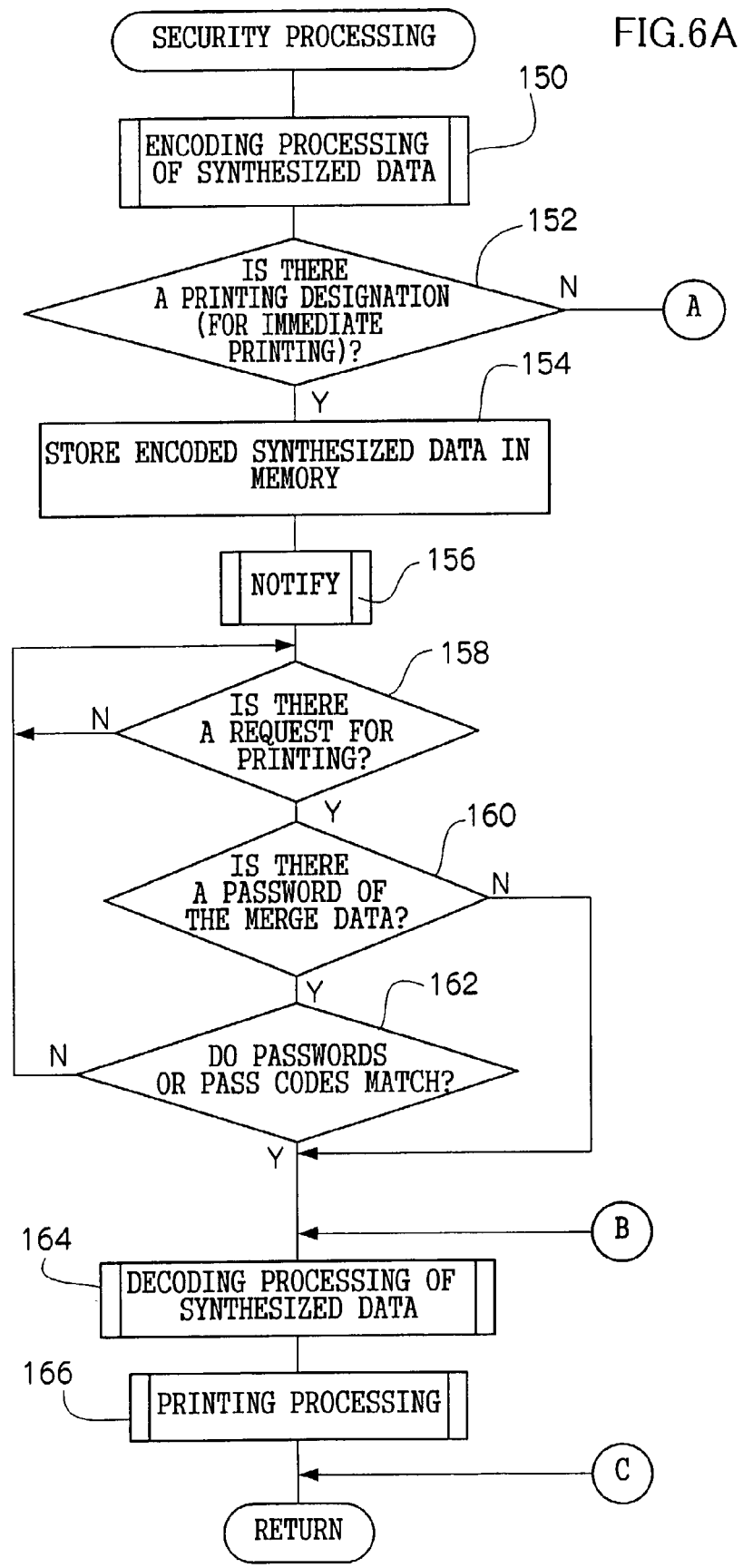
FIGS. 6A through 6C are flowcharts showing summaries of processings on synthesized data which is based on a merge job for which a pass code or a password is set.
Figure 6B:
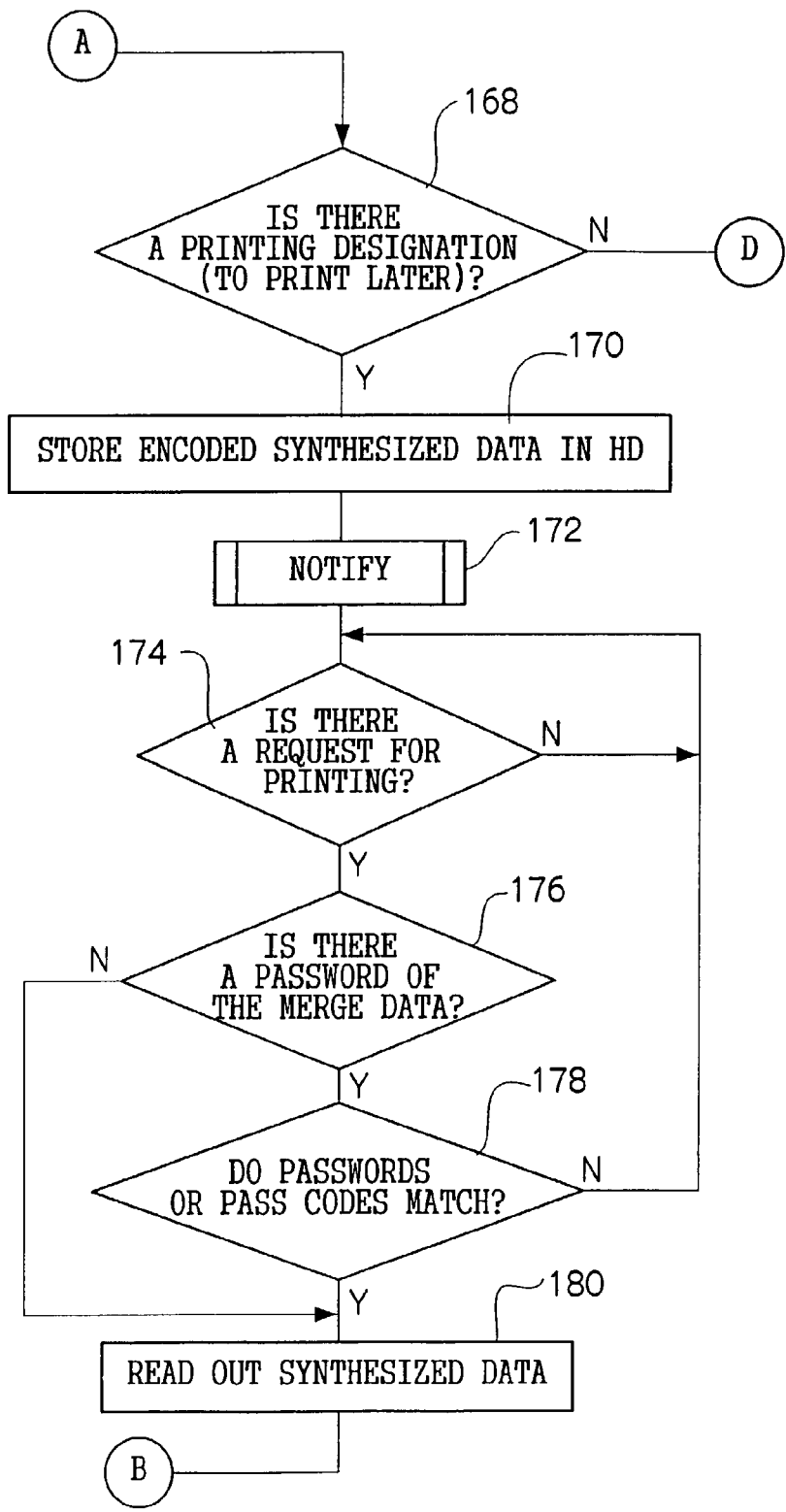
Figure 6C:
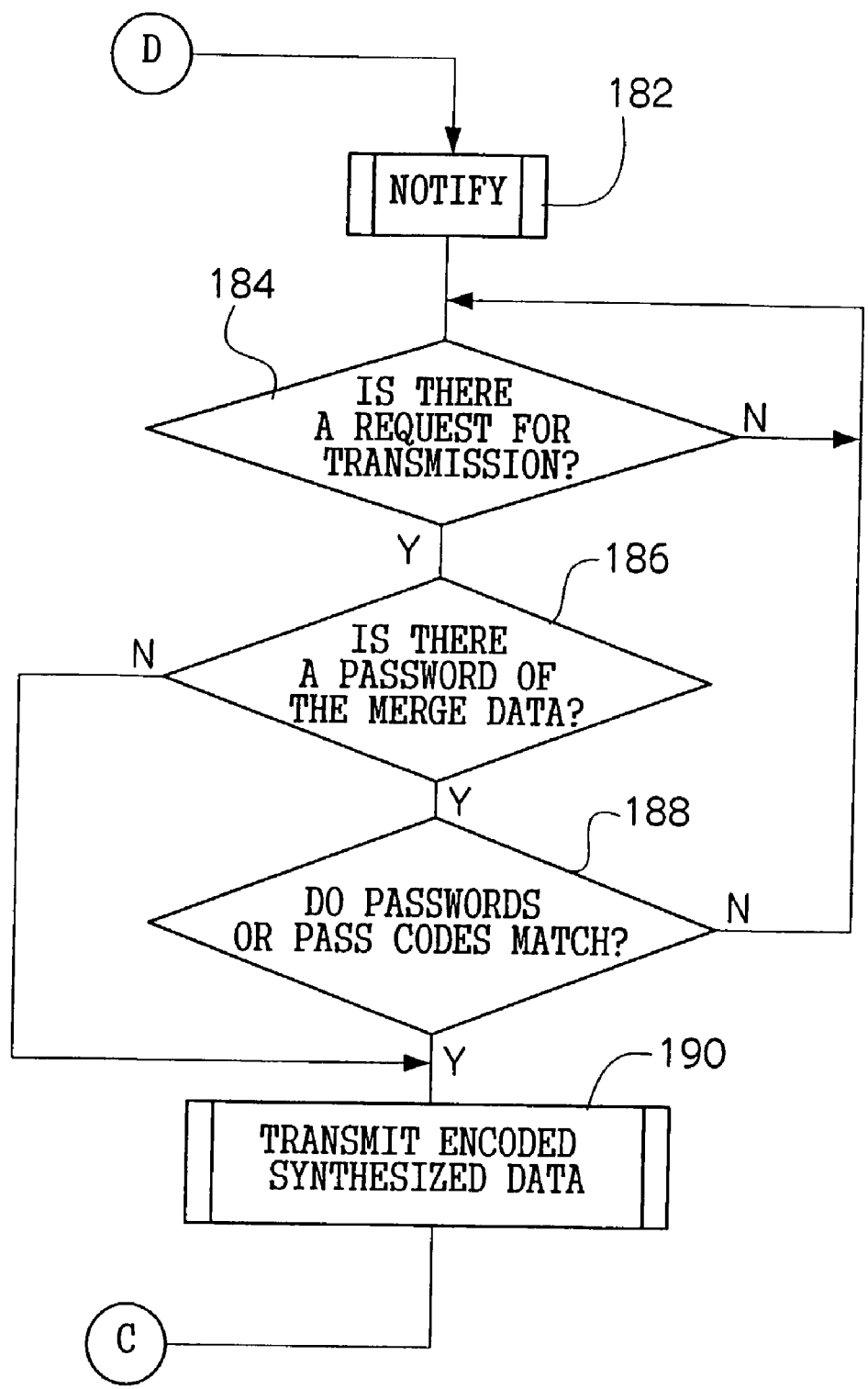

FIGS. 6A through 6C show the basics of security processing carried out at the print server 12. In this flowchart, in initial step 150, encoding processing is carried out on the synthesized data in which the merge data is synthesized with the form data.

When the encoding processing is completed, in step 152, it is confirmed whether the setting for merging processing is "print immediately". If this determination is affirmative, the routine moves on to step 154 where the encoded synthesized data is stored in the memory 46. Thereafter, in step 156, the client terminal 14 is informed by e-mail of, for example, the document number or the like for identification at the print server 12, as well as the fact that printing processing is possible.

In this way, the user, who has requested merging processing from the client terminal 14, can correctly determine that printing processing is possible. At this time, at the print server 12, display of a preview image based on the synthesized data is possible. When a preview image is requested from the client terminal 14, a preview image is generated and is transmitted to the client terminal 14. At this time, it is preferable that the preview image be transmitted in an encoded form.

When the user requesting the merging processing receives the notification (e-mail message) from the print server 12, the user inputs, for example, the document number specifying the merge job from the keyboard 42 provided at the print server 12. In this way, printing-out based on the synthesized data can be executed.

At this time, when a password is set for the merge data, the password is also entered.

At the print server 12, in step 158, it is confirmed whether or not an instruction to implement printing-out has been inputted from the keyboard 42. If an instruction to implement printing-out has been inputted, the determination in step 158 is affirmative, and the routine moves on to step 160.

In step 160, it is confirmed whether a password has been set for the merge data. If a password has been set, in step 160, the judgement is affirmative, and the routine moves on to step 162. At this time, if the password has been inputted together with the instruction for printing-out, collating of the passwords is carried out in step 164.

In this way, if the passwords match, the determination in step 162 is affirmative. The routine moves onto step 164 where decoding processing is carried out on the encoded synthesized data stored in the memory 46. In step 166, printing processing based on the decoded synthesized data is carried out. Note that, if no password is set for the merge data, the determination in step 160 is negative, and the routine moves on to step 164 where decoding processing and printing processing on the synthesized data are carried out.

In this way, when "print immediately" is designated, because the synthesized data is stored in the memory 46, printing processing can be carried out rapidly. At this time, because the synthesized data is stored in the memory 46 in an encoded form, it is possible to reliably prevent the contents of the synthesized data from being confirmed by a third party.

On the other hand, if "print immediately" is not set in the merge job, the determination in step 152 is negative. The routine moves on to step 168 where is it confirmed whether "print later" has been set. If the determination in step 168 is affirmative, the routine moves on to step 170 where the encoded synthesized data is stored in the HD 38.

Thereafter, in step 172, e-mail transmission is carried out in the same way as in previously-described step 156.

Thereafter, due to an instruction for printing-out being inputted from the keyboard 42 provided at the print server 12, the determination in step 174 is affirmative, and the routine moves on to step 176. In step 176, it is confirmed whether a password has been set for the merge data. If a password has been set (i.e., when the determination in step 176 is affirmative), in step 178, the password inputted from the keyboard 42 is collated.

In this way, if the passwords match, the determination in step 178 is affirmative, and the routine moves on to step 180 where the encoded synthesized data stored in the HD 38 is read-out, and is subjected to decoding processing (step 164) and printing-out (step 166).

At this time as well, because the synthesized data is stored in the HD 38 in an encoded form, it is possible to reliably prevent the synthesized data from being viewed indiscriminately. Further, by storing the synthesized data in the HD 38 and not storing it in the memory 46, the memory 46 is freed up, and therefore, it is possible to efficiently use the memory 46.

Namely, when there is some leeway, with respect to time, until the synthesized data is to be printed out, by using the HD 38 and not the memory 46, the memory 46 can be used efficiently.

When "return data" is set in the merge job, the determinations in steps 152 and 168 are negative, and the routine moves on to step 182 where the client terminal 14 (the user) who requested the merge job is notified by e-mail that data transmission is possible. Note that, in this case as well, it is confirmed whether a preview image is requested. When a preview image is requested, the preview image is transmitted.

Thereafter, for example, due to transmission being instructed from an unillustrated user interface provided at the print server 12, the determination in step 184 is affirmative, and the routine moves on to step 186. In step 186, it is confirmed whether a password for the merge data is set in the merge job. If a password is set, the determination is affirmative, and the routine moves on to step 188 where collating of the passwords is carried out. Note that, when an instruction to transmit data is inputted, if no password has been inputted, input of a password can be requested.

In this way, when the passwords match, the determination in step 188 is affirmative, and the routine moves on to step 190 where the encoded synthesized data is transmitted to the designated destination for transmission. The destination for transmission may be set in advance in the merge job, or may be inputted from the keyboard 42. Further, the destination for transmission may be a plurality of users or a group set in advance.

In this way, because the synthesized data is encoded even when the synthesized data is transmitted, it is possible to reliably prevent indiscriminate viewing on the network 10.

In this way, at the print server 12, when merging processing is carried out, by using form data for which a pass code is set or by setting a password for the merge data, the synthesized data is encoded and processed. In this way, it is possible to reliably prevent the synthesized data from being viewed indiscriminately. In particular, even if a password has not been set for the merge data, by using form data for which a pass code is set, the synthesized data can be held in an encoded state. Thus, it is possible to reliably prevent the form data from being offered up for indiscriminate viewing, and accurate security can be ensured.

Namely, even if a certifying seal image or a logo or a mark or the like is registered as form data (a merge form), it is possible to prevent these merge forms from being used indiscriminately. Further, it is possible to reliably prevent the image data and the print-out used in these merge forms from being offered up to be freely viewed.

Further, by setting a password for the merge data, printing-out and data transmission cannot be carried out unless the passwords match. Thus, for example, when merging processing is carried out by using, as the merge data, various types of customer information or examination questions or the like, leaking of the contents is reliably prevented, and a high level of security can be ensured.

A structure is possible in which, if no password has been set for the merge data, input of the pass code of the form data is requested, and when the pass codes match, decoding and printing-out of the synthesized data are executed. Further, the pass code of the form data which is used can be used as the password for the merge data in the merge job.

Moreover, a structure is possible in which, when printing-out corresponding to the merge job is to be executed, input of not only the password, but also the pass code is requested. Namely, when printing-out or the like is to be carried out, collation of the password set for the merge data and the pass code set for the form data can be carried out.

The form manager 36 can be structured so as to not only read-out the set form data from the HD 38, but also to judge the frequency of use of the form data, and to read out in advance from the HD 38 the form data having a high frequency of use.

Figure 7:
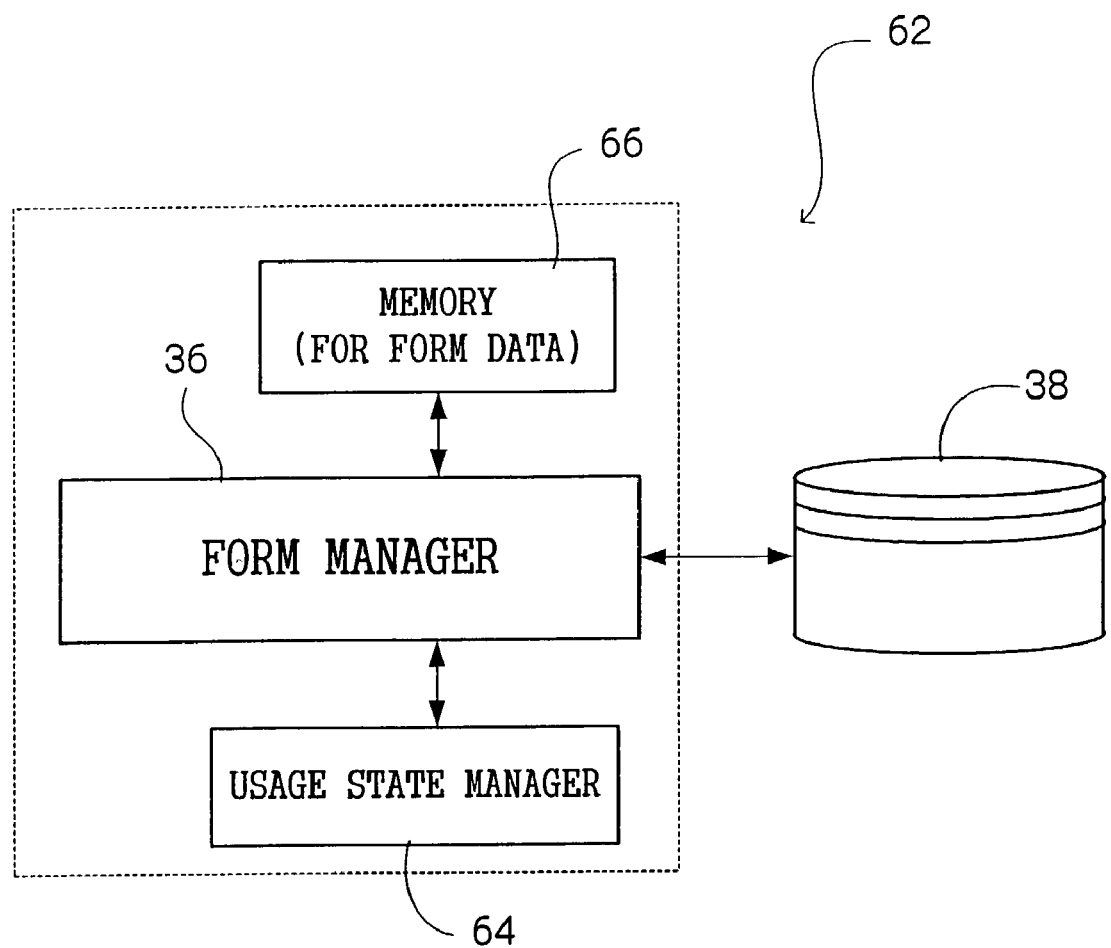
FIG. 7 is a schematic structural diagram showing another preferable example of a form manager.

Namely, a form manager 62 shown in FIG. 7 and serving as the read-out component forming the data processing device has, in addition to the form manager 36, a usage state manager 64 and a memory 66 (a semiconductor memory) which serves as the storing component (storing device) and uses a RAM or the like.

The usage state manager 64 counts, for example, the frequency of use of each registered form data, when the form manager 62 reads out from the HD 38 the form data set at a merge job.

Further, when the counted value exceeds a predetermined value, the usage state manager 64 reads out, from the HD 38 and in advance, a plurality of form data having high counted values, and stores them in the memory 66.

When a merge job, in which form data having a high frequency of use is set, is inputted, the form manager 36 reads out this form data not from the HD 38 but from the memory 66.

In this way, the time for reading out the form data can be shortened. Thus, the time required for processing the merge job can be shortened.

Note that the above-described embodiment is not intended to limit the structure of the present invention. As described above, in the present embodiment, description is given by using the print server 12 as an example. However, the image processing device of the present invention is not limited to a print server such as the print server 12, and maybe any of various types of intermediate servers which are connected to a network together with image processing terminals and which can carry out image processing, or the like.

What is claimed is:

1. An image processing device which, on the basis of a job inputted from an image processing terminal, carries out merging processing which synthesizes, with a predetermined merge form, a merge image which is based on one of image data and a drawing command of the job, said image processing device comprising:
a storing component which stores form data of the merge form and a verification code set for the merge form;
a read-out component which, when a verification code of a merge form is inputted in the job, collates the inputted verification code and the verification code stored in the storing component, and reading out, from the storing component, form data whose verification code matches the inputted verification code;
a synthesizing component which synthesizes merge data, which is based on the merge image, with the form data read out by the read-out component, so as to generate synthesized data;
an encoding component encrypting the synthesized data generated by the synthesizing component using the verification code to prevent the synthesized data from being viewed by others; and
a holding component which holds the encrypted synthesized data in an encrypted form.

2. The image processing device of claim 1, further comprising an outputting component which, due to a request for output being inputted, outputs data corresponding to the encrypted synthesized data held in the holding component.

3. The image processing device of claim 1, wherein, when a verification code for the merge image is set in the job, the synthesized data generated by the synthesizing component regardless of the form data is encrypted by the encoding component and is held in the holding component.

4. The image processing device of claim 2, further comprising an output collating component which, when the request for output is inputted, collates a verification code inputted together with the request for output, and at least one of a verification code set for the merge image and the verification code of the merge form, wherein the outputting component carries out outputting processing on the basis of results of collation by the output collating component.

5. The image processing device of claim 2, further comprising a decoding component which decrypts the encrypted synthesized data, wherein the outputting component outputs the decrypted synthesized data to a print-out device.

6. The image processing device of claim 2, wherein the outputting component outputs the encrypted synthesized data to the image processing terminal.

7. The image processing device of claim 1, further comprising a notifying component which notifies the image processing terminal that the holding component is holding the encrypted synthesized data.

8. An image processing system comprising:
an image processing terminal outputting a job; and
the image processing device of claim 1.

9. An image processing method which, on the basis of a job inputted from an image processing terminal, carries out merging processing which synthesizes a predetermined merge form, and a merge image which is based on one of image data and a drawing command of the job, said image processing method comprising the steps of:
a storing component storing form data of the merge form and a verification code set for the merge form;
when a verification code of a merge form is inputted in the job, a read-out component collating the inputted verification code and the verification code stored in the storing component, and reading out, from the storing component, form data whose verification code matches the inputted verification code;
a synthesizing component synthesizing merge data, which is based on the merge image, and the form data read out by the read-out component, so as to generate synthesized data;
an encoding component encrypting the synthesized data generated by the synthesizing component using the verification code to prevent the synthesized data from being viewed by others; and
holding, in a holding component, the encrypted synthesized data in an encrypted form.

10. The image processing method of claim 9, wherein, due to a request for output being inputted, an outputting component outputs data corresponding to the encrypted synthesized data held in the holding component.

11. The image processing method of claim 9, wherein, when a verification code for the merge image is set in the job, the synthesized data generated by the synthesizing component regardless of the form data is encrypted by the encoding component and is held in the holding component.

12. The image processing method of claim 10, wherein, when the request for output is inputted, an output collating component collates a verification code inputted together with the request for output, and at least one of a verification code set for the merge image and a verification code of the merge form, and the outputting component carries out outputting processing on the basis of results of collation by the output collating component.

13. The image processing method of claim 10, wherein a decoding component decrypts the encrypted synthesized data, and the outputting component outputs the decrypted synthesized data to a print-out device.

14. The image processing method of claim 10, wherein the outputting component outputs the encrypted synthesized data to the image processing terminal.

15. The image processing method of claim 9, wherein a notifying component notifies the image processing terminal that the holding component is holding the encrypted synthesized data.

16. An image processing device comprising:
   a storing device storing form data of a merge form, and verification information of the merge form;
   an input device for inputting verification information; and
   a data processing device which, when verification information is inputted from the input device,
   collates the inputted verification information and the verification information stored in the storing device,
   reads out, from the storing device, form data whose verification information matches the inputted verification information,
   synthesizes the read-out form data and merge data of a merge image, and
   encrypting the synthesized data using the verification code to prevent the synthesized data from being viewed by others.

17. The image processing device of claim 16, further comprising a holding device holding the encrypted synthesized data.

18. The image processing device of claim 16, further comprising an outputting device which, due to a request for output being inputted, outputs data corresponding to the encrypted synthesized data.

19. The image processing device of claim 18, further comprising an output collating device which, when the request for output is inputted, collates verification information inputted together with the request for output, and at least one of verification information of the merge image and the verification information of the merge form, wherein the outputting device carries out outputting processing on the basis of results of collation by the output collating device.

20. The image processing device of claim 18, further comprising a decoding device decrypting the encrypted synthesized data, wherein the outputting device outputs the decrypted synthesized data to a print-out device.

* * * * *